Aug. 19, 1930.　　W. J. GAGNON ET AL　　1,773,668
SAFETY CHAIN PROCESS AND MACHINE
Filed Sept. 7, 1927　　7 Sheets-Sheet 1

Fig.1.

INVENTORS
WILLIAM J. GAGNON
BERNARD E. GAGNON
ANDREW J. KOSHA
by their attorneys
Howson and Howson.

Aug. 19, 1930.  W. J. GAGNON ET AL  1,773,668
SAFETY CHAIN PROCESS AND MACHINE
Filed Sept. 7, 1927   7 Sheets-Sheet 5

INVENTORS
WILLIAM J. GAGNON
BERNARD E. GAGNON
ANDREW J. KOSHA
by their attorneys
Howson and Howson Patented Aug. 19, 1930

1,773,668

UNITED STATES PATENT OFFICE

WILLIAM J. GAGNON, BERNARD E. GAGNON, AND ANDREW J. KOSHA, OF BRIDGEPORT, CONNECTICUT, ASSIGNORS TO THE BEAD CHAIN MANUFACTURING COMPANY, OF BRIDGEPORT, CONNECTICUT, A CORPORATION OF CONNECTICUT

SAFETY-CHAIN PROCESS AND MACHINE

Application filed September 7, 1927. Serial No. 217,936.

This invention relates to a process and machine for the manufacture of so-called safety chain, also known as sheet metal chain, and more particularly for the manufacture of such chain from continuous strips of stock. Some of the objects of the invention are to increase the speed of production, to simplify the machine and its operation, and to produce an improved chain. In machines heretofore known for making sheet metal chain, the stock was cut up into separate links before the links were threaded together. This required a complex machine having successive cam movements and complicated finger feeds with manipulation of detached links through a large number of operations.

All these objectionable features are entirely avoided in this invention by assembling each link with its predecessor before it is cut off from the strip of stock. This threading of the new link is preferably done by the same movement that feeds the strip of stock forward through the stamping dies. In the specification where sheet metal chain is spoken of it should be understood as including any form of open link, loop-interlocked chain made from sheet metal, although the illustration given in the drawings is of the well known safety chain such as is used for window sash chains etc.

In the accompanying drawings—

Fig. 21 is a front elevation of a modification of the forming jaws; while

Referring to the drawings, the machine has a frame F carrying a fly-wheel W and a main shaft M, driven in any suitable manner. According to this new machine all parts moving from left to right receive their impetus from a single reciprocating element, namely a slide S, while all the parts moving vertically receive their impetus from another element, namely a gate G. It is one of the important features of this invention that the feeding forward or advancing of the strip of stock step by step through the various stamping dies is availed of to assemble or thread each link through its predecessor, this being made possible as already mentioned by keeping each new link undetached until it is threaded through the preceding link. This combined feeding and assembling movement is given by the horizontally reciprocated slide S actuated by cam C on the main shaft M through the intermediary of a pivoted lever 25.

Mounted on the slide S and its horizontal extension 26 are two cam feeding or come-along devices which feed the stock in one direction only. They draw the stock to the right when the slide moves in that direction, but release the stock while the slide is moving to the left and take a new grip upon it when starting the next movement to the right. The first of these come-along devices is located to the left of the first die and includes a pivoted cam piece 27 above a ledge 28 over which the stock passes. This cam piece 27 is spring-pressed against the stock at a point slightly to the right of vertical in such manner that when the slide moves to the right the cam piece wedges the stock against the ledge 28 and carries it to the right. The cam piece will pass freely over the stock without gripping it when moving to the left. There is a pin 27$^a$ projecting from the cam piece 27 which enables the operator to free the stock by pushing against the spring if this becomes necessary in starting or adjusting the machinery.

Figure 5:
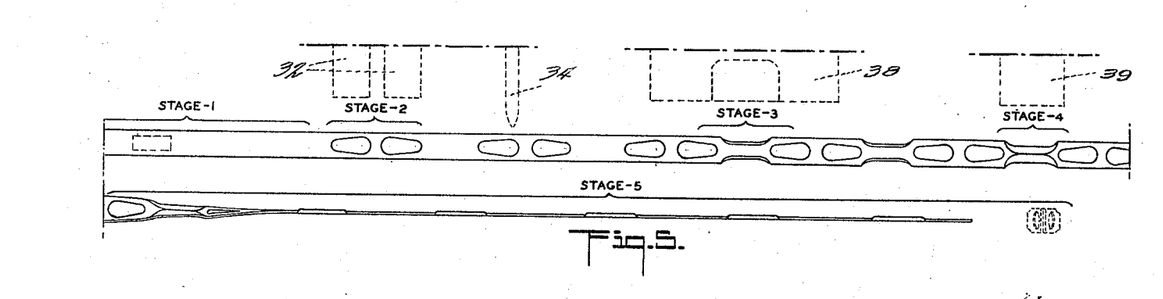
Fig. 5 is a continuous plan view of the strip of stock in the first five stages of the process of manufacture, the moving punches and dies being shown in dotted lines at the points at which they operate on the stock.

The second come-along is located between the stamping dies and the point at which the link is cut off and bent to U-shape. This come-along is substantially the same as the one already described, consisting of a spring-pressed cam piece 29 cooperating with a rigid finger 30. These parts are mounted in a manner which will be described later. It will be noted that these two come-alongs cooperate to feed the stock through all the dies and to keep it taut. The feeding forward of the stock by the come-along is shown in Fig. 5 as constituting the first stage of manufacture of the chain, the cam piece 27 being indicated in dotted lines.

In the example shown and described the first stamping operation on the stock is the punching of the eyes in the arms or ends of the link by a piercing die 31 and punches 32. The dies 31 are fixed on the frame F and the punches 32 are carried by the gate G and reciprocate vertically with it. The stock lies on the surface of the die 31 and there is a pierced cover plate 33 on top of the die to help hold the stock in position. This plate is grooved to receive the stock. In the embodiment shown in the drawings, the two punches 32 are close together and instead of punching the two eyes of a single link, punch one eye of one link and the nearer eye of the succeeding link, these two eyes being closer together than the eyes in the two arms of any one link. This piercing of the eyes constitutes the second stage of manufacture. The links are not cut apart at this stage. Adjacent the punches 32 is a pilot pin 34 also carried by the gate G. This pilot pin is longer than the punches 32 and upon the descent of the gate reaches the stock before the punches 32. It is so located that it enters the large end of the hole stamped by the left hand punch 32 on the previous descent of the gate. If by any chance the two come-alongs have not left the stock in exactly the correct position, this pilot pin will bring the stock to the correct position. In order that that central portion may be easily inter-looped with the eyes of the two arms of the preceding link, it is customary to cut the central portion of each safety chain link to a narrower width than the arms. When the links are made according to the process which will now be described, the material which heretofore has been cut off to narrow the central portion of each link is not removed but is folded inwardly to reinforce the central portion. It should be understood, however, that the links need not necessarily be reinforced. This folding is done during the third and fourth stages of the process of manufacture.

At the third stage the edges of the central portion are forced up to a vertical position and at the fourth stage the vertical lips thus formed are flattened down on to the central portion forming a mid-section of two thicknesse (Figs. 5, 12, 14 and 15).

Figures 13, 14, 15:
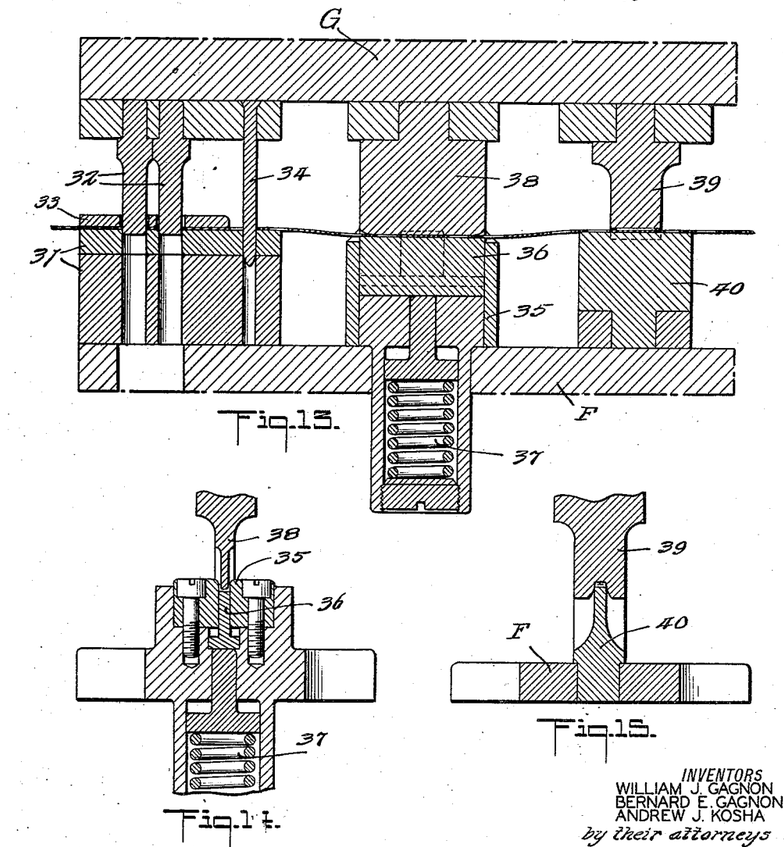
Fig. 13 is a sectional elevation on the line 13—13 of Fig. 12 showing the dies and punches operating on the strip of stock in the 2nd, 3rd and 4th stages.
Fig. 14 is a sectional elevation on the line 14—14 of Fig. 12, through the die and punch used in the 3rd stage of manufacture.
Fig. 15 is a sectional elevation on the line 15—15 of Fig. 12 through the die and punch used in the 4th stage of manufacture.

The die at the third stage of manufacture has a stationary outer portion 35 and a narrow central portion or pad 36 lying lengthwise under the stock. This pad 36 is held up to the normal level of travel of the stock and the top of the stationary portion of the die by a spring 37 (Figs. 13 and 14). The pad is cut down in the line of travel of the stock except at its midpoint to permit the stock to be depressed. This cut or channel in the stationary portion of the die is narrower at this midpoint than on either side, the distance between its two beveled edges being equal to the desired width of the mid-section of the link (Figs. 12 and 14), but the stationary die not interfering at any other point with the stock being depressed by the punch 38.

There is a punch 38 cooperating with the stationary portion 35 and the pad 36, which punch is slightly narrower than the width of the pad at its mid-point for a distance equal to the portion of the mid-section of the link which it is desired to reinforce and to fit the die.

The punch is curved up slightly at each end, which allows the stock to be forced below the normal line of travel without distortion. When the gate descends it forces punch 38 down into the die against the pressure of the spring 37. The center of the punch pressing what is to be the mid-section of the link down between the center edges of the stationary portion 35 of the die forces up two lips to vertical position. This die 35, 36 and punch 38 are spaced from the die 31 and punch 32 such a distance that the reciprocations of the slide S cause these lips to be formed accurately between the piercings in the two arms of what is to become the link.

After these upright lips have been formed the reciprocations of the slide S carry the stock forward to the fourth stage, where the lips are folded down. This is accomplished by a folding die 39 carried by the gate and the stationary die 40 on the frame of the machine. The stationary die 40 at its mid-point is of the reduced width of the mid-section of the link (see Fig. 15), while the folding die 39 is channeled out to the same width, the walls of the channel being flared out. The engagement of the die 39 with the stationary die 40 causes the upstanding lips to be folded down on the center portion of the mid-section (see Fig. 12). After this fourth stage the links are complete except that they have not been detached from each other.

The next stage of manufacture is in preparation for the novel stage of threading the end of the stock through the previously formed link and thereby attaching another link to the chain. In the machine shown in the drawings, the previously formed link is being held in a vertical position and it is therefore necessary to turn the end of the stock at right angles until it lies in a vertical plane in order to thread it through the oval eyes of the previous link. This is the fifth stage of manufacture. This turning is accomplished by mounting the second come-along on means oscillating through ninety degrees and thereby twisting the end of the stock. The cam piece 29 and rigid finger 30 are carried by a channeled collar 41 adapted to slide on a tubular shaft 42 longitudinally of the line of travel of the stock. This second come-along is moved in unison with the first come-along from the slide S by means of a yoke 44 embracing the collar 41 and mounted on the extension 26 of the slide. It is rotated 90° by the turning of the tubular shaft 42, the cam piece 29 and the rigid finger 30 lying in longitudinal slots 43 in the tubular shaft and acting as splines. The cam piece 29 is reasonably free in the slot 43 to release and engage the stock and may, if necessary, be released manually by the operator by means of a pin 51. The tubular shaft 42 is permanently fastened to a sector gear 45 which is reciprocated by a rack 46 located below the tubular shaft 42. This rack is moved forward and back in the frame of the machine from a cam 47 on the main shaft of the machine by means of levers 48, 49 and shaft 50.

Not only does the second come-along turn the stock to a vertical plane, but the tubular shaft also serves to turn the stock by means of an eccentric guiding slot 52 in a split bushing 53, carried in the right end of the tubular shaft. This specially designed eccentric split bushing is shown in detail in Figs. 16 and 17, the guiding slot 52 being substantially longer than the width of the stock and passing through the longitudinal axis of the bushing. When the slot is in horizontal position it extends further to the left as it appears in Fig. 18 than to the right. There is a flat table 55 to the right of the tubular shaft and the eccentric bushing, which is at the normal level of travel of the stock through the dies, and there is a guide plate 54 fastened on the end of the tubular shaft resting on the top of this flat table 55. When this slot 52 in the eccentric bushing is in a horizontal plane, the stock lies on the surface of the table which serves to keep the stock in the bushing up to a minimum level, namely the normal level of travel of the stock.

Figure 16:
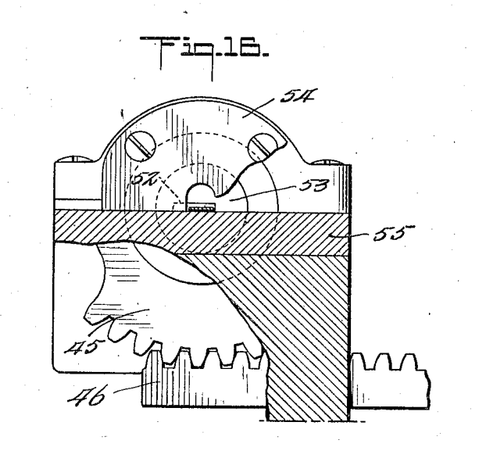
Fig. 16 is an elevation from the right side of the machine, showing the rack, eccentric bushing and guide plate when the stock is in a horizontal plane.
Figure 17:
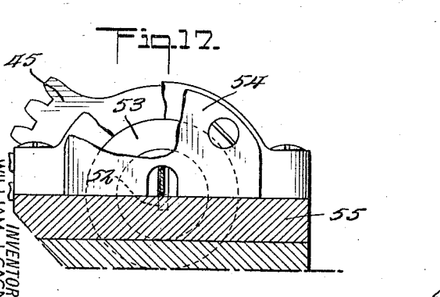
Fig. 17 is a similar view of the eccentric bushing and guide plate showing the stock in a vertical plane.
Figure 18:
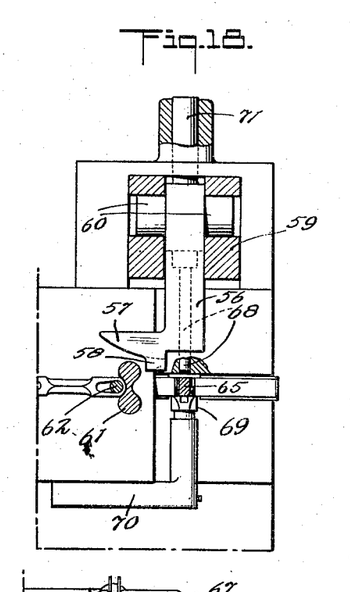
Fig. 18 is a plan view of the table of the machine where the links are cut-off and bent into U-shape, the parts being shown at the 9th stage of manufacture shown in Fig. 9.

When the rack is pushed forward the eccentric bushing is turned 90° clockwise as viewed in Figs. 16 and 17 which carries one end of the slot 52 below the table. However, the slot is sufficiently long to permit the stock to slide upwardly in the slot without any wedging. The action of the come-along assists in preventing any wedging effect. The guide plate 54 has an arched opening in it corresponding to the width of the stock at its widest point, and this plate serves to guide the stock when horizontal.

Figures 6, 9:
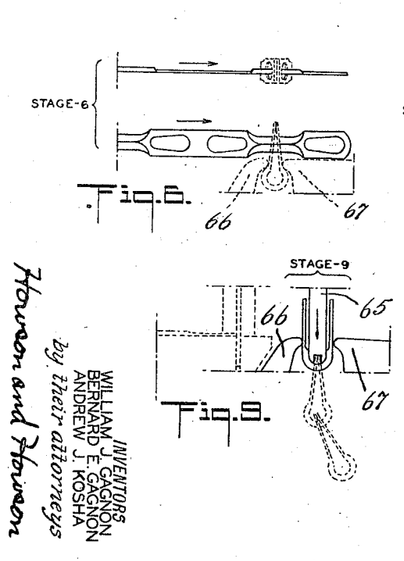
Fig. 6 consisting of a plan view with a view in elevation below it shows the sixth stage of manufacture in which the end of the stock is threaded through the previously formed link, the latter being shown in dotted lines.
Fig. 9 is a view in elevation of the 9th stage of manufacture, namely the bending of the new link into U-shape.

The sixth stage through which the stock passes is the actual interlooping or threading of the undetached link through the link previous to the one whose manufacture is being described. This previous link has already been U'd up and preferably formed in its final shape. The second come-along and the oscillating bushing having brought the end of the stock to a vertical plane, the slide S pushes the stock to the right, passing the undetached link through the upright, previously formed link until the mid-section of the flat undetached link lies in the arms of the bent link and under the bending punch. The position of the parts at this moment is shown in Figure 6.

Figure 1:
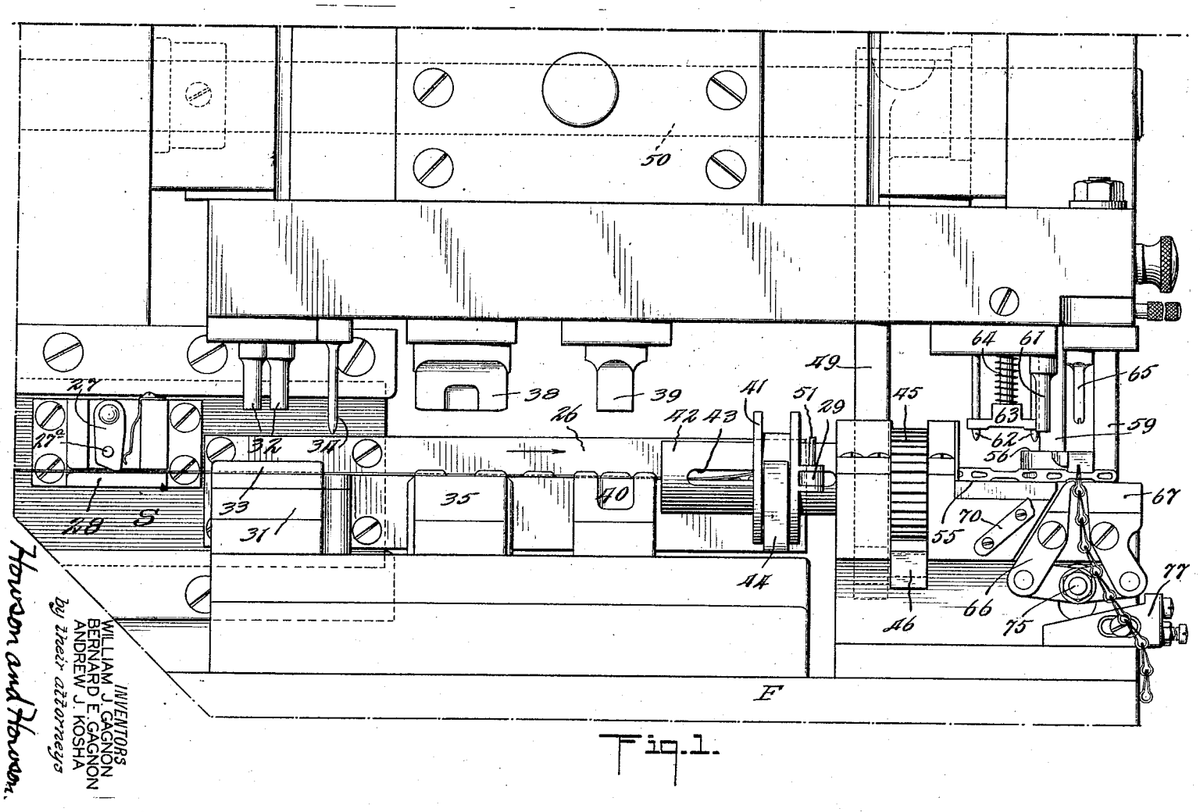
Fig. 1 is a front or longitudinal elevation of the central part of a chain making machine showing the strip of stock passing through the machine from left to right.
Figure 2:
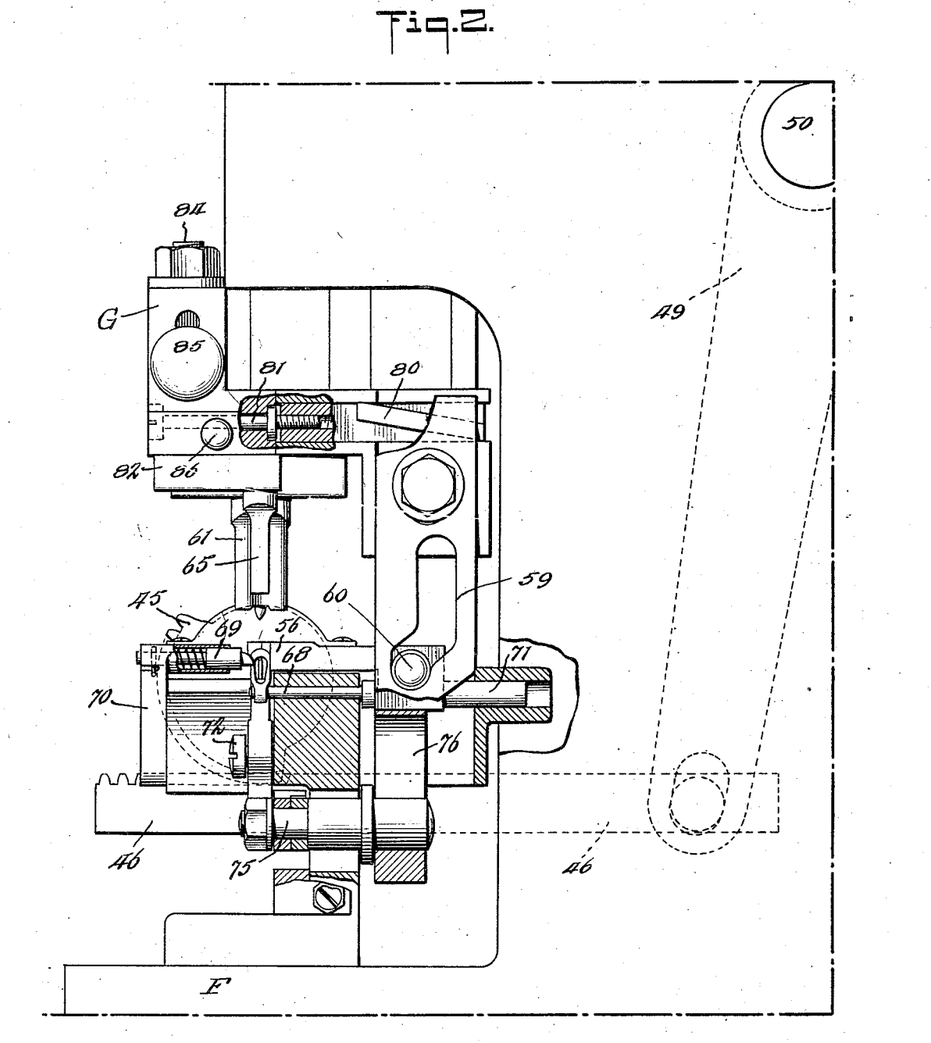
Fig. 2 is an elevation from the right side of the portion of the machine shown in Fig. 1, the view being partly broken away to show the forming pin and the interlooping guide in their forward or operative positions.
Figure 4:
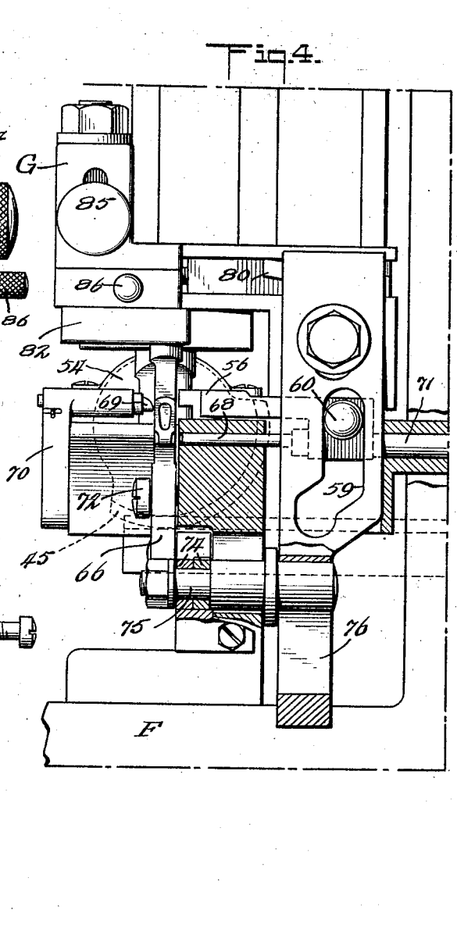
Fig. 4 is an elevation of the machine from the right side showing the bending punch in its down position.
Figure 19:
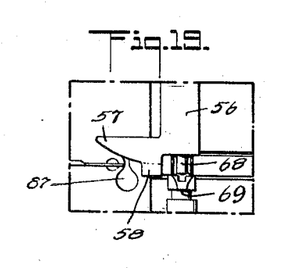
Fig. 19 is a plan view corresponding to Fig. 18, showing the parts after the forming pin and interlooping guide have been brought forward into position preparatory to the 6th stage of manufacture.

To assist in bringing the parts to this position there is a movable interlooping guide 56 overlying the table 55 and having a beveled edge 57 and a beveled ear 58. It has been discovered that owing to the modifications of the stock caused by the third and fourth stages of manufacture, the stock when turned up on edge facing the rear of the machine, always tends to bend slightly to the rear of the machine, and the horizontally beveled edge 57 tends to guide the end of the stock back directly into line with the previous link. The beveled ear 58 lies just above the upper edge of the stock when turned vertically and is beveled downwardly to hold the stock down. It has been found that with a guide of this shape, the stock will always thread through the previous link properly. This guide 56 is moved forward and back, into and out of operative position by the gate G. The vertical movement of the gate is translated into the necessary forward and backward movement by an inclosed cam 59, bolted to a bracket carried by the right end of the gate (Figures 2, 4 and 19). The rear end of the guide 56 forms an enlarged block from which rollers 60 project on either side, lying in the slots of the cam 59. It will be observed that the cam 59 is so shaped as to bring the guide 56 forward when the gate is at the top of its stroke and to retract the guide shortly after the gate begins its descent.

Figure 22:
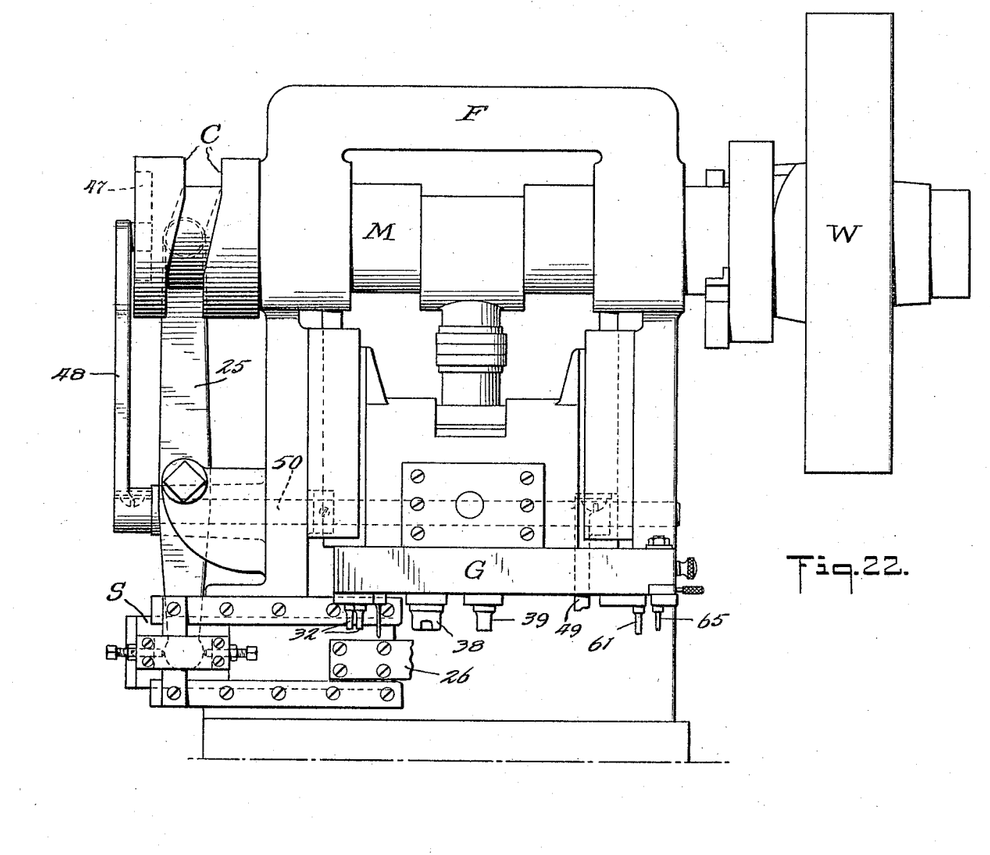
Fig. 22 is a front elevation of the frame and the means driving the gate and slide.

When the link, still attached to the stock, has been threaded through the previously formed link, the rack 46 is withdrawn under the influence of the inside cam 47 on the end of the main shaft M (Fig. 22) thus returning the stock to its normal horizontal plane. This movement constitutes the seventh stage (Fig. 7).

Figures 7, 8, 10, 11:
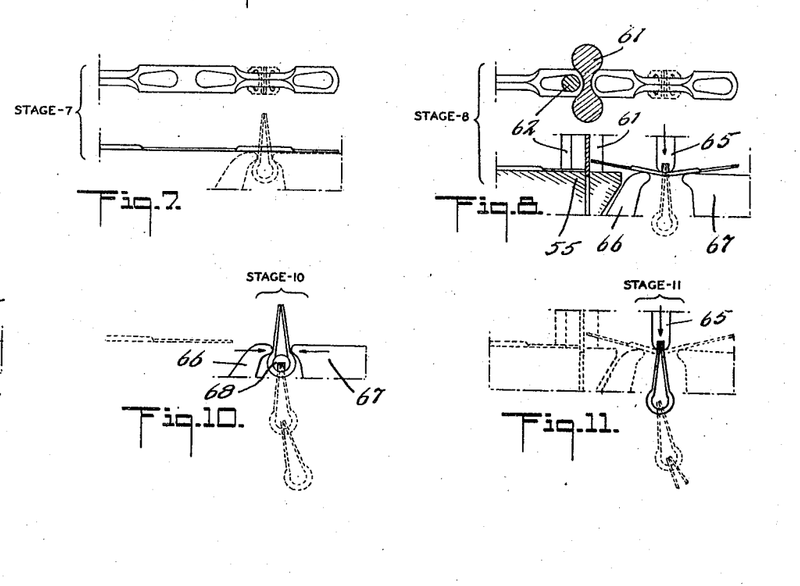
Fig. 7 is similar to Fig. 6 and shows the seventh stage of manufacture in which the strip of stock has been returned to a horizontal plane.
Fig. 8 is similar to Figs. 6 and 7 and shows the eighth stage of manufacture in which the end of the strip of stock is cut off.
Fig. 10 is a view similar to Fig. 9 and showing the 10th stage of manufacture in which the new link is crimped into its final shape by the forming jaws.
Fig. 11 is a view similar to Figs. 9 and 10 and shows the new link being ejected from the machine by the bending punch in the 11th stage of manufacture.
Figure 12:
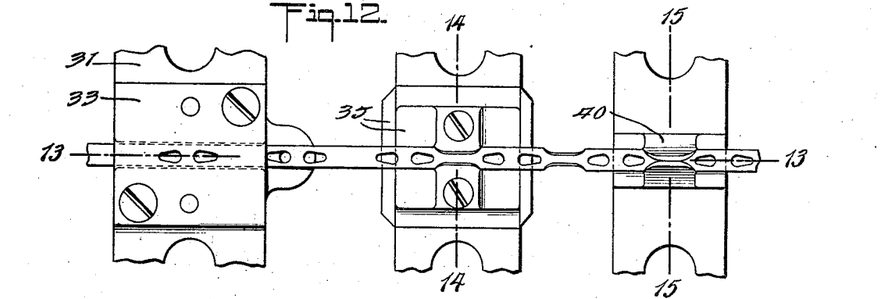
Fig. 12 is a plan view of the dies used in the 2nd, 3rd and 4th stages of the process of manufacture.

The next stage of manufacture is shown in Fig. 8, and comprises the severing or detaching of the newly threaded end or link from the strip of stock. This is done by a shearing punch 61, mounted on the gate and cooperating with a slot 87 in the table 55, which constitutes the die for this punch. This punch and die are of dumbbell shape, thus giving the ends of the arms of the links the usual arcuate shape. To insure that the stock is in proper registry and to hold it down during the shearing operation, two registry pins 62 and a pad 63 are provided. These pins are carried by the gate and are slightly longer than the shearing pin in order that they may enter the stock before the punch. The pad 63 is threaded on the registering pins, and is adapted to exert cushioned pressure against the stock by means of a spring 64 coiled around the stem of the pad.

The ninth stage of manufacture, namely the U'ing or bending of the newly detached link into U shape with its two arms pointing upward is begun at practically the same instant that the link is detached from the stock. This U'ing is caused by a U forming or bending punch 65 mounted on the gate a fraction of an inch higher than the shearing punch 61. The lower end of this bending punch 65 is notched out to receive the ends of the two arms of the preceding link which, by this time, have been brought close together, and the bending of the newly detached link is caused, as usual, by the bending punch pushing the previously formed link downward between the cooperating crimping jaws which act as a die for the punch. The lower end of the bending punch is rounded on the outside to give the proper curve to the mid-section of the link. This U-forming punch performs an additional function in that as it first touches the preceding link it causes a tension on the undetached flat link at the same time that the shearing punch 61 shears the flat link from the strip of stock. This cooperation of the bending punch makes the shearing accurate and makes it possible to cut off the links at any desired speed. To hold the newly bent link in position while the next operations are performed a link-locating member 69 is provided. The link-locating member 69 is a horizontal spring-pressed pin having a shouldered operating end (Fig. 2). This pin is carried in a bracket 70 mounted on the front of the machine outside of a plate (not shown) which covers the forming jaws 66 and 67. The spring forming part of this link-locating device tends to hold the head of the link-locating member forward in the path of the link lying between the forming jaws. The head of this member is beveled backwardly on its upper side with the result that as the bending punch 65 descends, it forces the link-locating head out of line with the arms of the newly detached link, thus enabling those arms to bend up to positions opposite the end of the head. The bending punch, however, does not prevent the head bearing against these arms thus holding the link from dropping out, (see Fig. 19). This link-locating member acts as means to hold the link in position in line with the stock.

The newly bent link is next crimped into its final form by movable forming jaws 66 and 67 which jaws were in their open position during the U'ing operation. Cooperating with these forming jaws in this crimping operation is the forming pin 68 (Figs. 2, 4, 18, 19). This forming pin lies in a horizontal plane facing toward the front of the machine and is adapted to enter the curved mid-section of the newly U'd link before the forming jaws begin their crimping action. It serves to brace the mid-section of the link from collapse, and to hold the link in accurate register. The pin has a slot in its lower edge to receive the upper ends of the arms preceding the one which is being crimped. The pin is mounted in the block which constitutes the rear end of the interlooping guide 56 by means of a rod 71 forming a rearward extension which slides in a hole in the frame of the machine. This rod is gripped in the block portion of the guide 56 and the pin therefore moves forward into and back out of operative position simultaneously with the guide 56. The rod 71 and the forming pin 68 sliding through the frame of the machine serve to hold the pin and guide 56 from vertical movement with the cam 59. The forming jaws 66 and 67 themselves are pivoted to the frame of the machine at 72 and 73 respectively. The lower ends of the two jaws are connected by a toggle 74, the lifting of whose pin 75 causes the forming jaws to close and perform their crimping operation around the forming pin. This crimping operation constitutes the tenth stage of manufacture. The toggle pin 75 receives its crimping action from an elongated slot 76 in the lower end of the inclosed cam 59 (see Fig. 4). This elongated slot 76 is so located that the toggle pin 75 receives its elevating motion just at the end of the upward movement of the gate G (see Fig. 2). If it is desired to vary the degree to which the forming jaws open when acting as a die for the punch, the lowermost position of the toggle pin 75 can be changed by regulating a wedge 77, slidably mounted on the frame of the machine below the toggle pin (see Fig. 3).

Figure 20:
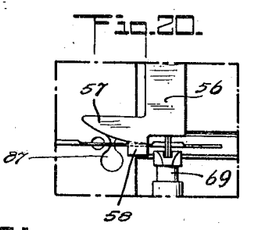
Fig. 20 is a plan view corresponding to Figs. 6 and 18, showing the 6th stage of manufacture in which the end of the stock has just been threaded through the previous link.

The action of the forming jaws 66 and 67 in crimping the arms of the newly detached link around the forming pin 68, brings the ends of the arms in contact with each other. These ends then are opposite the vertical slot in the end of the head of the link-locating member 69, and the spring of that member forces the head forward until it holds the arms, as shown in Fig. 20. The link-locating member thus holds the newly formed link in register with the bending punch 65 until the bending punch descends again, engages the ends of the arms of the link and pushes the link-locating member back, as already mentioned. The friction of the link locating member 69 with the arms of the link serves to hold the link from dropping out of the machine before the next undetached link is threaded through it.

Figure 21:
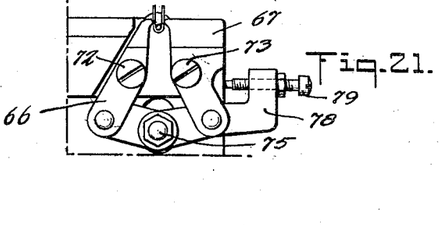

In Fig. 21 is shown a slightly modified means of adjusting the degree of opening of the forming jaws. In this modification the wedge is replaced by an extension 78 on one of the arms of the toggle which reaches around the end of the machine. This extension carries a set screw 79 engaging against the end of the machine and limiting the bottom position of the pin 75.

If it is desired to vary the time of operation of the forming jaws 66, 67, interlooping guide 56, and forming pin 68 relatively to the slide S and gate G, this can be done by varying the vertical elevation of the enclosed cam 59. This is accomplished by bevel means 80 on the gate which take into a beveled slot on the inner face of the enclosed cam 59 at its upper end. The adjustment is given by a screw 81 on the face of the gate, and the parts are tightened by the bolt which holds the cam on the gate.

Figure 3:
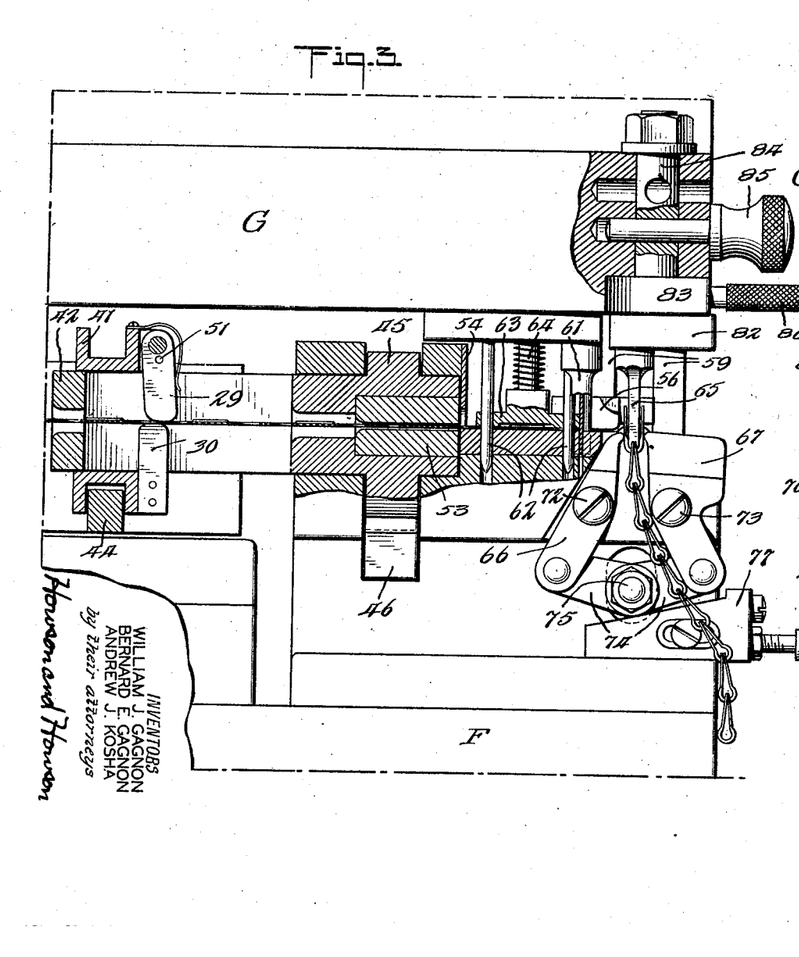
Fig. 3 is a front elevation on an enlarged scale of the right end of the machine, the view being partly in section with certain parts removed to show the tubular shaft, the come-along through which the stock passes, and the forming jaws.

It will be noted that this machine is adapted to make chain from a continuous strip of stock, but when the roll of stock becomes exhausted it is necessary to reload the machine. At such a time it is necessary to prevent the bending punch 65 from ejecting the last link before the new stock arrives at the forming jaws and has been interlooped with the last link. This undesired ejection of the last link before the next one is interlooped with it is avoided by putting the bending punch out of action, namely, moving it out of operative relation with the jaws and their elements. The bending punch 65 is carried by a punch holder 82, which in turn is bolted to a rotary swinging member 83, held in place by a stud 84, (Fig. 3). Upon removal of the pin 85, the punch holder and rotary swinging member can be turned by means of the handle 86, thus swinging the bending punch out of operative position. It can be fastened either 90° or 180° out of position by inserting the pin 85 through one or the other of its slots in the gate.

The construction of the machine having been described, its operation will now be set forth by following the progress of one link through the machine.

When the gate G is at the top of its movement, the slide S starts its movement from left to right, the cam pieces 27 and 29 of the two come-alongs gripping the stock and carrying it forward with the slide. This carries forward the eye formed by the left punch 32 on the last cycle so that it becomes the right eye of a link, and the right eye formed by the right punch 32 on the descent of the gate makes the left eye of the same link.

Practically simultaneously with the starting of the movement of the slide to the right, the gate starts to descend, but the slide has completed its movement before any of the punches or pins carried by the guide reach the stock. The pilot pin 34 passes in the large end of the right eye of the link whose manufacture we are following, and immediately thereafter the piercing punches 32 enter the stock, making both the left eye of this link and the right eye of the following link. The slide S starts back to the left as soon as the pilot pin 34 enters the stock and arrives at its left position just before the punches leave the stock during the return movement of the gate.

In the example shown in the drawings, the link is advanced half way toward the folding die 38 on the next reciprocation of the slide. On the second reciprocation the link will come in position for the third stage of manufacture. In this position the forming die 38 descends into the stationary die 35, 36 when the gate descends, striking up two vertical lips at the mid-point between the two eyes of the link. Two more reciprocations of the slide are required to carry the link to the fourth stage where the folding die 39 crimps or folds these lips down, thereby forming the reinforced mid-section. As the die 39 rises out of engagement with the stock, the rack 46 (Fig. 2) starts forward under the influence of the cam 47 on the left end of the main shaft. This rack turns the sector gear 45 forward and upward until it has travelled through an angle of about 90°, carrying with it the tubular shaft 42, the channeled collar 41 and the end of the stock with the undetached link on it. This is the fifth stage of manufacture. As soon as the stock has been turned to a vertical plane the slide starts to the right, and the stock is guided accurately through the previous link by the beveled edge 57 and beveled ear 58 of the guide 56. The guide was brought to its forward operative position by the inclosed cam 59 simultaneously with the bringing forward of the rack. The sixth stage of manufacture having thus been completed, the mechanism is now in the position shown in Fig. 20. The rack 46 now retires, turning the sector gear 45, tubular shaft 42, collar 41, and the come-along 29, 30 back till the stock is in the normal or horizontal plane. This movement is the seventh stage and starts when the gate is about a quarter of the way down on its next descent.

As the gate descends, the two registry pins 62 pass through eyes in the stock, the right hand pin passing through the right eye of the following link. The link is now accurately in position even if there was an error in the movement of the slide. The spring pad 63 descends on the stock and holds the following link flat on the table. Immediately thereafter the shearing punch 61 descends and cuts the link off the strip. Almost simultaneously therewith the U'ing punch 65 grips the upper ends of the arms of the preceding link, exerts pressure on the link as it is cut off, and pushes the link-locating member 69 back out of the path of the arms of the links. This is the eighth stage.

The ninth stage of manufacture finds the forming jaws 66 and 67 open since the elongated slot in the lower end of the inclosed cam 59 is at the upper end of its movement. The degree of opening of these forming jaws having been accurately adjusted before starting the machine by means of the wedge 77, the continued descent of the bending punch 65 causes the link to take the shape shown in Fig. 9, and pushes the link downwardly until its mid-section is in position to be penetrated by the forming pin 68. The link is held in this position partly by the weight of the forming jaws 66 and 67 and partly by the friction of the link-locating member 69. The parts are now in the position shown in Figs. 4 and 18.

As the gate approaches the top of its next ascent, the rollers 60 on the block portion of the guide 56 are forced forward by the inclosed cam 59 till the guide 56 is in operative position and the forming pin 58 has penetrated the mid-section of the link. Owing to the length of the elongated slot 76 the toggle pin 75 does not start to move upwardly until the forming pin 68 has reached its extreme forward or operative position. The raising of the toggle pin 75, acting through the toggle 74, causes the forming jaws to pinch together, crimping the link to its final form as shown in Fig. 10, and causing the upper ends of the two arms to come together and permit the link-locating member 69 to spring forward and hold them in the vertical slot in its end. The parts are now in the position shown in Fig. 20. This completes the tenth stage.

The descent of the bending punch 65 on the next cycle ejects the link from the forming jaws, (Fig. 11), thus completing the eleventh and last stage of manufacture of the link.

Many variations which do not depart from the scope of our invention and from the example just described will be obvious to those skilled in the art. Thus for instance, the stamping of the links may be accomplished in a different number of operations and the spacing of the punches and dies may be varied.

What we claim is:—

1. In a process for making chain from sheet metal stock, the steps of stamping a link from sheet metal stock without cutting it apart, threading the undetached link through the previously threaded link by the movement which advances the stock for the next stamping operation, and then in a single step cutting off and bending the newly threaded link.

2. In a process for making chain from sheet metal stock, the step of narrowing the stock to form the mid-section of a link but without detaching the link, turning the undetached link to a plane in which it can be threaded through the previous link, threading the undetached link and presenting it, while still undetached, in position to be acted on by forming means, and subsequently cutting off the threaded end to form a link.

3. In a process for making chain from sheet metal stock, the step of stamping a link from sheet metal stock without cutting it apart, turning the undetached link to a plane in which it can be threaded through the previous link, threading the undetached link through its predecessor by a movement advancing the stock for the next stamping operation, returning the undetached link to its normal plane, and then cutting off and bending the newly threaded link.

4. In a process for making chain from sheet metal stock, the step of stamping a link from sheet metal stock without cutting it apart, turning the undetached link to a plane in which it can be threaded through the previous link, threading the undetached link through its predecessor by a movement advancing the stock for the next stamping operation, returning the undetached link to its normal plane, and then cutting off and bending the newly threaded link simultaneously with the next stamping operation.

5. In a process for making chain from sheet metal stock, the step of advancing the sheet metal stock for the dual purpose of positioning it for the next stamping operation and threading the end of the stock through the previous link, alternated with the step of simultaneously making the next stamping operation, cutting off the threaded end of the stock and bending that end to form a link.

6. In a machine for making chain from sheet metal stock, a die, a shearing punch, a bending punch, and a moving element carrying said die and punches in combination with jaws adapted to cooperate with the bending punch in bending the links and to crimp same, and a reciprocating element adapted to advance the stock through the die and simultaneously thread the end of said stock through the link between the crimping jaws, said shearing punch being adapted to cut off the link being bent by the bending punch.

7. In a machine for making chain from sheet metal stock, a horizontally reciprocating element, a come-along carried by said element to advance said stock by steps, oscillating means adapted to rotate said come-along through an arc of substantially 90° whereby said stock may be threaded through a previously bent link, said oscillating means being adapted to return said stock to its original plane after the threading.

8. In a machine for making chain from sheet metal stock, a horizontally reciprocating element, a come-along carried by said element to advance said stock by steps, oscillating means adapted to rotate said come-along through an arc of substantially 90° whereby said stock may be threaded through a previously bent link, said oscillating means being adapted to return said stock to its original plane after the threading, and means to cut off the end of said stock after said return.

9. In a machine for making chain from sheet metal stock, a horizontally reciprocating element, and a come-along carried by said element adapted to advance the stock step by step, in combination with a bushing having an eccentric slot therein passing through the longitudinal axis of said bushing and through which the stock is adapted to pass, oscillating means adapted to rotate said come-along and bushing approximately ninety degrees, and a surface adapted to keep the stock in the bushing up to a minimum level, for the purpose described.

10. In a machine for making chain from sheet metal stock, a die, a shearing punch, a bending punch; and a gate carrying said die and punches in combination with oscillating means adapted to turn the end of the stock through approximately ninety degrees, and a reciprocating element adapted to simultaneously advance the stock and thread it through the previously bent link.

11. In a machine for making chain from sheet metal stock, a die, a shearing punch, a bending punch and crimping jaws adapted to cooperate with said bending punch, in combination with a reciprocating element adapted to feed the stock forward under the die and through the link in the crimping jaws, a gate carrying said die and punches in the first-mentioned order adapted to operate same during movement in one direction and to operate the crimping jaws during movement in the opposite direction.

12. In a machine for making chain from sheet metal stock, a bending punch, a pair of jaws opposite said punch, adapted to form a die for said punch and to crimp the link bent by said punch, in combination with a link-locating member between said punch and jaws adapted to hold a link in the positions given it by said punch and jaws until the next operation of said punch.

13. In a machine for making chain from sheet metal stock, a die, a shearing punch, a bending punch, and a moving element carrying said die and punches in combination with jaws adapted to cooperate with the bending punch in bending the links and to crimp same, and a reciprocating element adapted to advance the stock under the die and punches and simultaneously thread the end of said stock through the link between the crimping jaws, said shearing punch being adapted to cut off the link being bent by the bending punch, said bending punch being adapted to be swung out of operative relation with the stock.

In testimony whereof we have signed our names to this specification.

WILLIAM J. GAGNON.
BERNARD E. GAGNON.
ANDREW J. KOSHA.